Sept. 13, 1932. W. H. MUZZY 1,876,730
LIQUID LEVEL INDICATOR FOR AUTOMOBILES
Filed Oct. 23, 1926 2 Sheets-Sheet 1
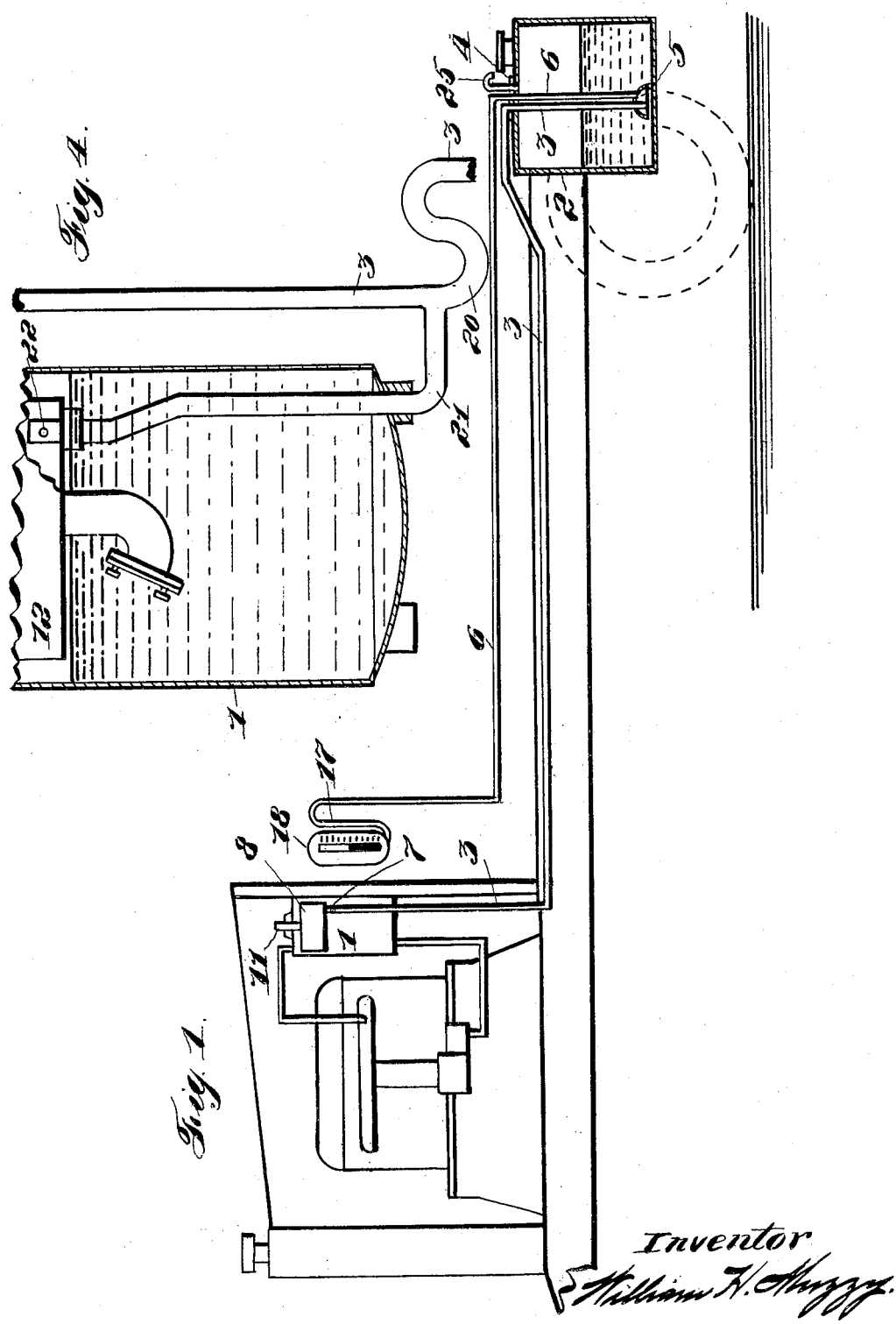
Inventor
William H. Muzzy.

Sept. 13, 1932.                    W. H. MUZZY                    1,876,730
                     LIQUID LEVEL INDICATOR FOR AUTOMOBILES
                       Filed Oct. 23, 1926        2 Sheets-Sheet 2
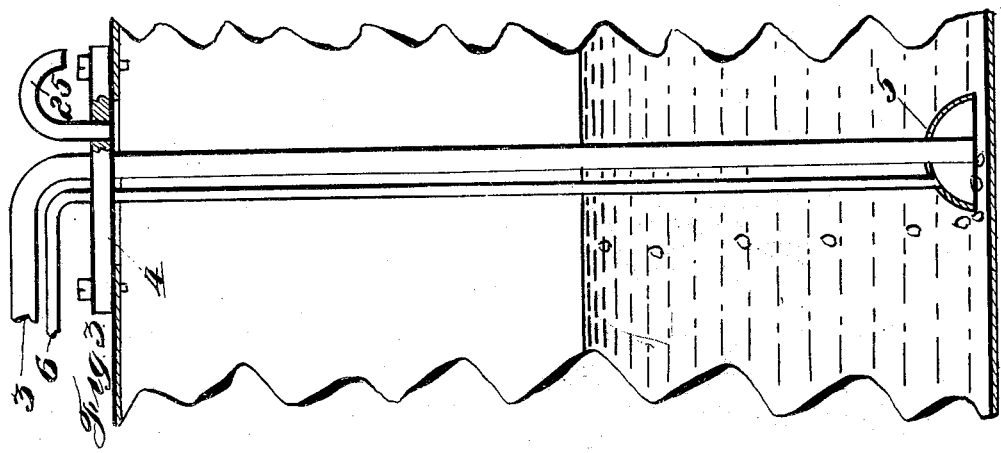
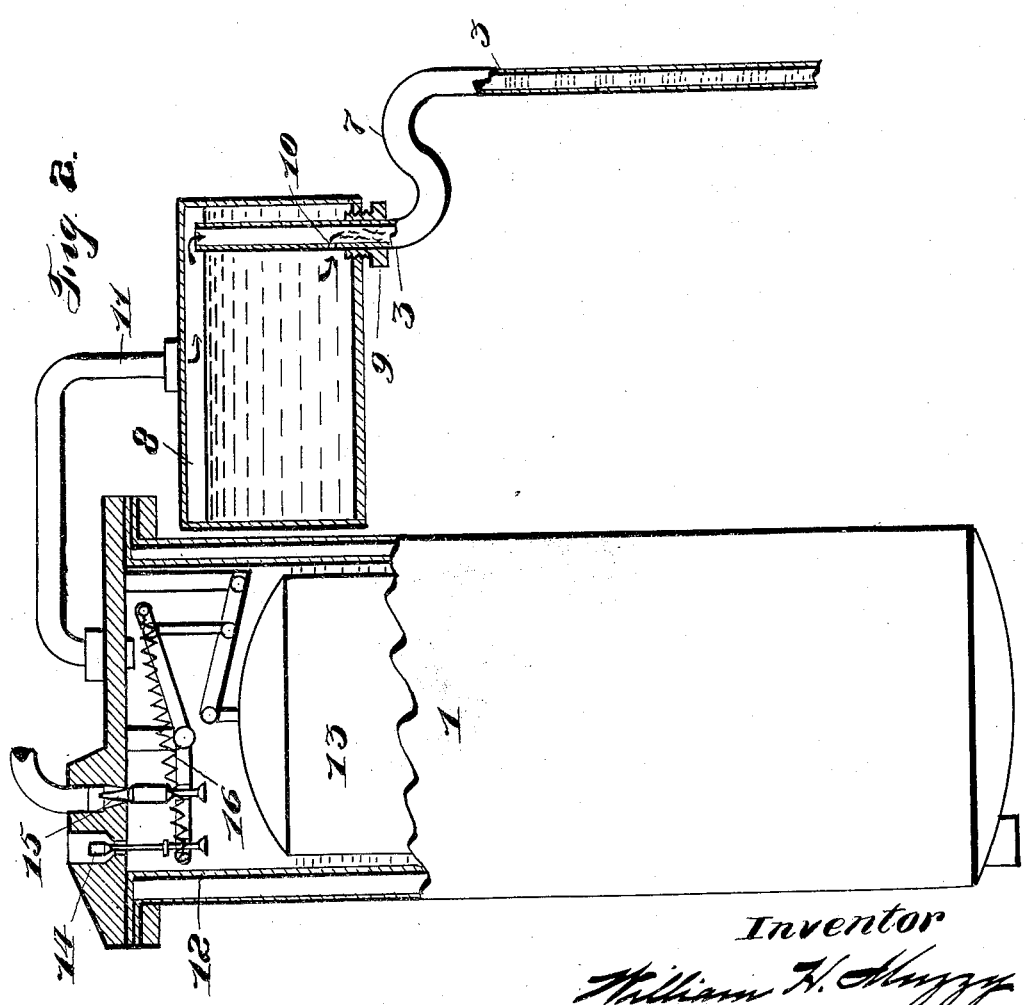
Inventor
William H. Muzzy Patented Sept. 13, 1932

1,876,730

UNITED STATES PATENT OFFICE

WILLIAM H. MUZZY, OF EVANSTON, ILLINOIS, ASSIGNOR TO KING-SEELEY CORPORATION, OF ANN ARBOR, MICHIGAN, A CORPORATION OF MICHIGAN

LIQUID LEVEL INDICATOR FOR AUTOMOBILES

Application filed October 23, 1926. Serial No. 143,636.

This invention relates to improvements in liquid level indicators and has more particular relation to improvements in dash indicating gasoline gages for automobiles.

The object of the invention is to provide an improved construction of hydrostatic gage in which the balancing air column is reconditioned or provided with new air periodically.

Another object of the invention is to provide an improved gage in which the air in the balancing column is renewed and rebalanced by the operation of the vacuum fuel feeding tank.

Still another object of the invention is to provide an improved vacuum fuel feeding tank which causes air to be entrained with the backward flowing gasoline to recharge the balancing air column of a hydrostatic gage.

Another object of the invention is to provide means for causing air to be entrained with the backward flowing gasoline in the fuel system to recharge the balancing air column of a gage.

Another object of the invention is to provide an improved construction for feeding fuel from the supply tank to the engine without mixing it with air and to entrain air with the gasoline in the feed pipe as it flows back to the supply tank and cause the gasoline in the gage pipe to be displaced by air to the full depth to be measured.

The invention also has other objects which will be hereinafter more particularly set forth and claimed in the following specification.

In the accompanying drawings forming part of this specification:

Figure 1 represents a side elevation, partly in section, of the chassis of an automobile with my improvements applied thereto;

Figure 2 represents a side elevation of a vacuum fuel feeding tank, partly broken away, with my improvements applied thereto and shown in section;

Figure 3 represents a vertical section, partly broken away, of the main fuel tank with my improvements applied thereto, and;

Figure 4 represents a detail section, partly in elevation of my improved devices built into the vacuum fuel feeding tank.

Described in general terms the invention comprises a construction and arrangement of parts whereby the gasoline is fed from the supply tank at the rear of the machine to the carburetor of the engine by the usual vacuum tank. The gasoline in its forward and upward movement from the supply tank to the vacuum tank travels in a solid stream of gasoline so that no air will be introduced into the vacuum tank in the shape of gas and foam to be drawn to the engine and interfere with its operation. The vacuum tank operation is intermittent as usual and well known in the art and shown and described in the patent to Webb Jay No. 1,158,924, Nov. 2, 1915.

When the pumping operation of the tank is completed air is admitted to the inner chamber of the vacuum tank by the rising of the float and the opening of the air valve. The gasoline at that time in the fuel feeding line is thus left unsupported and is drawn back by gravity to the main supply tank at the rear. It is when this column of solid gasoline starts to move back that I entrain air with a moving quantity of gasoline and draw and push this air by the fall of the gasoline so that it is forced down to the full depth of the gasoline in the supply tank and then escapes from the fuel pipe and enters the gage pipe and connections and displaces any gasoline therein (caused by leaks or the like) to the full depth to be measured. All surplus air escapes from the lower end of the air pipe and passes up through the gasoline in the main tank into the atmospheric air space of the tank.

The forward end of the air pipe at the dash is provided with the well known U gage to indicate to depth of liquid in the main supply tank at the rear.

Described in detail the vacuum tank 1 shown in Figure 1, is connected to the main gasoline supply tank 2 at the rear by a fuel pipe 3. This pipe passes through a plate 4 secured to the top of the rear tank and extends downward to the full depth to be measured. The lower end of this pipe 3 in the supply tank supports an air trap 5 having its lower open side on the level of the extreme depth of the liquid to be measured and indicated. The air pipe 6 of the gage line is connected at its lower open end to the air space of the air trap by passing through its upper wall. The air from the trap can thus enter the air pipe freely. As the lower end of the fuel pipe 3 also extends to a level even with the lower edge of the air trap it will be seen that when the escaping air brought back by the backward flowing gasoline in the fuel pipe, enters the trap it is retained therein until all of the gasoline that may be in the trap is forced downward and out of the trap, the surplus air escaping around the edge of the trap as shown in Figure 3. An exact balance with the full depth of the liquid is thus secured and maintained as new air is forced back each time the gasoline flows back from the vacuum tank or the receptacle outside of the vacuum tank.

The forward end of the pipe 3 extends upwardly adjacent to the dash board and is formed with an air trap 7 shown in Figure 2. The pipe 3 extends into a closed chamber 8 nearly to the top of the same and is held in position by an attaching nut 9. A small hole 10 is formed in the side wall of the pipe 3 within the chamber and near the bottom of the same. A pipe 11 connects the upper part of the chamber to the inner receptacle 12 of the vacuum tank. This inner receptacle which is air tight, is provided with a float 13, an atmospheric valve 14, a suction valve 15, a throwing spring 16 and operating and connecting links and levers for causing the rising of the float to open the atmospheric valve and close the suction valve as shown in Figure 2 and fully described in the aforesaid patent to Webb Jay.

As the operation of this vacuum tank is so well known in the art it is thought that no further description of the same is necessary.

By reference to Figure 2 of the drawings it will be seen that in order for gasoline from the main tank to enter the vacuum tank the chamber 8 must first fill and the gasoline then pass over to the vacuum tank through the pipe 11.

When the pumping operation is complete and the float of the vacuum tank rises and opens the atmospheric valve as shown in Figure 2, air is immediately admitted to the chamber 8 through the pipe 11. The unaerated gasoline in the pipe 3 is no longer supported by the vacuum and starts back toward the tank at the rear by action of gravity. This causes a downward drag in the fuel pipe. The first effect of this is to draw all the gasoline out of the extended end of the pipe 3 after the level in the chamber 8 has fallen below the upper end of this pipe. This is caused because the gasoline in the pipe 3 may pass freely downward but the gasoline in the chamber 8 is restrained by the small hole 10 from passing freely into the pipe 3, this hole having an area less than that of the pipe. However, the area of the hole is sufficient to allow a sufficient flow of gasoline therethrough and into the trap 7, where air has already preceded it to trap the air in the loop and as the drag and the pressure exerted by the gasoline increases, to force the entrapped air over the loop and downwardly through the pipe. The entrained air is thus forced down the feed pipe by the returning gasoline and finally enters the main supply tank at the rear but within the supply pipe. The force of the descending air and gasoline is sufficient to displace all of the gasoline from the lower end of the pipe 3 when the air enters and renews the air connections.

The capacity of the chamber 8 is only sufficient to fill the pipe 3 with entrained air and gasoline and discharge a few bubbles from the lower end of the pipe 3 after atmosphere has been admitted to the inner chamber of the vacuum tank.

The capacity of the device is such however that if an error of 50 per cent is present because of a leak in the pipe this error will be corrected by a single cycle of operation of the vacuum tank.

It will further be seen that with the lower end of the pipe 3 free to draw gasoline from the tank without disturbing the contents of the trap 5 that there is no disturbance of the indication on the instrument on the dash during the time that the feed through the feed pipe is taking place.

The U tube indicating instrument on the dash comprises the usual U tube 17 containing a colored liquid and connected to the air column pipe 6 so that the liquid rises and falls with the change of pressure within the pipe in a manner well known in the art. An index plate 18 is mounted in front of one leg of the U tube so that the indication may be properly read by the operator.

In the modified form of my invention shown in Figure 4 I utilize a portion of the contents of the inner chamber of the vacuum tank sufficient to flow back through the fuel pipe and entrain air therewith.

In this modified form the pipe 3 is connected to a trap 20 similar to the trap 7 and then extends upwards and into the top of the inner chamber of the vacuum tank in the usual manner.

A branch pipe 21 extends from the trap 20 up through the bottom of the outer chamber of the vacuum tank and into the inner chamber of the vacuum tank. The upper end of this branch pipe is closed but its side wall is provided with a small port 22.

When atmospheric pressure is admitted to the inner chamber as before described, the contents of the pipe 3 above the trap 20 soon passes below the trap and thus admits air to the trap. The continued passage of gasoline from the inner chamber of the vacuum tank through the small port 22 and pipe 21 to the trap causes air to be entrained as before described and forced back to the main supply tank and introduced into the air balancing column of the gage just in the same manner as before described.

When the vacuum tank is pumping gasoline the fuel will enter the inner chamber of the tank through the pipes 3 and 21.

When the tank stops pumping the gasoline in the inner chamber will pass into the lower chamber and also back through the pipe 21 to effect the back feed of air to the connections.

The pipe 21 may extend up into the inner chamber of the vacuum tank and the discharge port 22 be located at any desired level to secure frequent or infrequent operations of the vacuum tank.

It will be understood that the arrangement of the pipe 21 and the port 22 relative to the vacuum tank float may be varied so that the pipe 21 may get a sufficient amount of gasoline without so lowering the float as to trip the valves. With such an arrangement the valves would practically be tripped by the lowering of the levels in the inner and outer chambers of the tank by use of the gasoline in the carburetor. The operation of the device is the same in any event and such an arrangement would be employed to secure fewer operations of the tank.

With the parts arranged as shown in Figure 4 if the level of the fuel in the outer tank is lowered, as for instance with the throttle wide open and where the lowered vacuum is not sufficient to operate the tank, then just as soon as the tank starts to work again the gasoline released from chamber 12 will run both into the lower chamber and down the pipe 21.

It is thus automatically determined as to whether there shall be air entrained for the connections according to the surplus or lack of surplus of fuel for the engine. The engine is thus not denied fuel in order that this fuel may be used for operating the gage but the gage is operated often enough if such operation takes place only when a surplus of fuel is present. It will be seen from the above that with either of the constructions no air is pulled into the vacuum tank with the gasoline and the balance and perfect running of the engine is not disturbed by any mixture of gasoline and air that may reach it through the vacuum tank suction pipe connected to the manifold.

In known systems in which air is drawn up the fuel feeding pipe with the fuel a foam forms in the inner chamber of the vacuum tank and is drawn over through the suction pipe when the suction valve is open and greatly interferes and often stops the engine.

The main fuel supply tank 2 is of course provided with the usual filler opening provided with a vented closing cap. As the vent of this cap may be accidentally stopped and a pressure built up within the tank 2 which might disturb the gage 17 a vent pipe 25 is mounted in the plate 4 so that pressure may escape from the air space of the tank.

As the lower end of the pipe 3 within the tank 2 freely communicates with the contents of the tank any blowing back of excessive air pressures through the pipe 6 by a repair man to clear the pipe of possible condensation, will not blow the liquid out of the gage as this air will escape freely up through the gasoline and out through the vent pipe 25.

It will of course be understood that the size of chamber 8 and the aperture 10 may be varied to meet the conditions found in different types of cars. For example, where there is more or less fall or head in the gas line from the vacuum tank to the main supply tank.

Having thus described my invention what I claim as new and desire to secure by Letters Patent is:

1. In an automobile, the combination with a fuel supply tank, of a vacuum tank having an inner chamber adapted to communicate with the air, a pipe having its lower end portion opening within the supply tank and its upper end portion extending upwardly within the inner chamber and provided with an opening in its side near the bottom of the inner chamber, means for placing said pipe in communication with the inner chamber above the first mentioned opening, a pressure gauge, and a connection extending from the gauge and communicating with the interior of the supply tank at the full depth to be measured, the lower end of the pipe and the connection being so related that the air entrained with the fuel upon the return of the fuel from the inner chamber to the supply tank and discharged from the pipe will be received in the connection.

2. In an automobile, the combination with a fuel supply tank, of a vaccum tank having an inner chamber adapted to communicate with the air, a pipe having its lower end portion opening within the supply tank and its upper end portion extending upwardly within the inner chamber and closed at its upper end and provided with an opening in its side near the bottom of the inner chamber, a second pipe communicating with the inner chamber above the first mentioned opening and communicating with the first mentioned pipe below the first mentioned opening, a pressure gauge, and a connection extending from the gauge and communicating with the interior of the supply tank at the full depth to be measured, the lower end of the pipe and the connection being so related that the air entrained with the fuel upon return of the fuel from the inner chamber to the supply tank and discharged from the first mentioned pipe will be received in the connection.

In testimony whereof I affix my signature.

WILLIAM H. MUZZY.